United States Patent [19]
Grund et al.

[11] Patent Number: 5,788,433
[45] Date of Patent: Aug. 4, 1998

[54] COOLANT PIPE FOR TOOLHOLDER

[75] Inventors: Peter Grund, Trossingen; Rudolf Haninger, Seitingen, both of Germany

[73] Assignee: Chiron-Werke GmbH & Co. KG, Tuttlingen, Germany

[21] Appl. No.: 833,835

[22] Filed: Apr. 10, 1997

[51] Int. Cl.$^6$ .................................................. B23B 51/06
[52] U.S. Cl. ........................... 409/136; 408/56; 408/57; 408/59
[58] Field of Search ..................... 408/56, 57, 59; 409/136

[56] References Cited

U.S. PATENT DOCUMENTS

| | | | |
|---|---|---|---|
| 2,184,919 | 12/1939 | Miller | 408/56 |
| 2,855,614 | 10/1958 | Simon | 408/56 |
| 3,795,957 | 3/1974 | Steusloff | 408/56 |
| 4,082,472 | 4/1978 | Mossner et al. | 408/57 |
| 4,668,135 | 5/1987 | Hunt | 408/56 |
| 4,992,012 | 2/1991 | Cioci . | |
| 5,346,344 | 9/1994 | Kress et al. . | |
| 5,405,220 | 4/1995 | Ishikawa | 408/56 |

FOREIGN PATENT DOCUMENTS

| | | |
|---|---|---|
| 4117765 | 12/1992 | Germany . |
| 4213590 | 12/1992 | Germany . |
| 4423432 | 9/1995 | Germany . |
| 732121 | 5/1980 | Sweden ............ 408/56 |

OTHER PUBLICATIONS

European Search Report dated Aug. 25, 1997—EP 9710 5191.7.

Primary Examiner—Daniel W. Howell
Assistant Examiner—Adesh Bhargava
Attorney, Agent, or Firm—Cummings & Lockwood

[57] ABSTRACT

A holder for a tool comprises a tapered hollow shaft, having an upper opening, for clamping into a tool receptacle, and a coolant tube arranged in the interior of the tapered hollow shaft for delivery of coolant to the tool. The coolant tube comprises an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact. A cover for the inlet opening is provided, which prevents chips from getting into the coolant tube. In addition, a further tube section, the outside diameter of which is smaller than that of the upper tube section, adjoins the upper tube section at the bottom. Upon coupling of the holder, the sealing ring is located in the region of the further tube section, and is not brought into sealing contact with the enveloping surface of the upper tube section until clamping occurs.

24 Claims, 4 Drawing Sheets

FIG_1

1
COOLANT PIPE FOR TOOLHOLDER

BACKGROUND OF THE INVENTION

1. Field of the Invention

The present invention relates to a coolant tube for a holder for a tool, which comprises a tapered hollow shaft, having an upper opening, for clamping into a tool receptacle, such that the coolant tube is arranged in the interior of the tapered hollow shaft for delivery of coolant to the tool; and the coolant tube has an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact.

The invention further concerns a holder having a coolant tube of this kind.

2. Related Art

Holders of this kind having a coolant tube are known from the related art, and are referred to as HSK tool holders.

Said holders consist substantially of three sections, namely first of all the tapered hollow shaft, adjoining which at the bottom is a thickened collar on which, for example, gripper grooves for automatic tool changing mechanisms are provided. Adjoining said collar at the bottom is a holding shaft onto which a variety of tools can be attached. Since some of said tools must be cooled with coolant during operation, there is provided in the interior of the tapered hollow shaft a centered, stepped threaded hole into which a coolant tube can be threaded. Said coolant tube has a central coolant conduit through which the coolant coming from the machine tool arrives at the particular tool.

Tool holders of this kind, or HSK tool holders, are standardized; they can be fitted with various tools and then clamped into a tool receptacle which is provided in a spindle of a machine tool and has an opening complementary to the tapered hollow shaft.

The tapered hollow shaft is equipped with an upper opening through which the jaw segments and the draw-in taper of a clamping system can engage into the interior of the tapered hollow shaft. Clamping of the tapered hollow shaft into the receptacle is accomplished by the fact that in their released position, the jaw segments are first swung inward and inserted, together with the draw-in taper, through the opening into the tapered hollow shaft. The draw-in taper is then pulled partly back out of the tapered hollow shaft by way of its draw-in rod, thereby pressing the jaw segments outward into their clamping position, in which they rest against the interior of the tapered hollow shaft and clamp the latter nonrotatably to the spindle.

Before clamping, however, in a coupling process, provision must be made for the tool, i.e. the tool holder, to be in correct radial alignment with the spindle. Said coupling takes place while the spindle is rotating at its coupling speed, and is performing a relative motion with respect to the tool holder. The tool holder has already been inserted into the receptacle during coupling, but the clamping system has not yet been actuated. To achieve radial alignment between holder and spindle, slide blocks are provided on the spindle, and corresponding depressions on the holder or the tapered hollow shaft, the slide blocks and depressions being arranged and adapted to one another such that the slide blocks can engage into the depressions only in the prescribed radial orientation between spindle and holder. As soon as this coupling operation is complete, the holder rotates along with the spindle, and is now finally drawn into the tool receptacle and clamped by the clamping system.

When the holder is inserted into the tool receptacle, the coolant tube enters a centered bore, provided in the draw-in taper and the draw-in bar, through which coolant is then delivered during operation. Provided in the front region of said bore is a sealing ring, preferably an O-ring, which comes into contact with the cylindrical outer enveloping surface of the coolant tube. During the coupling operation described above, a radial relative movement occurs between the O-ring and the coolant tube, such that the O-ring shifts axially with respect to the coolant tube during the clamping operation. In other words, when the holder is inserted into the tool receptacle, the O-ring is first slid relatively far onto the coolant tube, and then is pulled back somewhat, after coupling, during the clamping operation.

In machine tools fitted with the known HSK tool holder, problems repeatedly occur during operation in connection with the supply of coolant to the tools. Coolant supply is often interrupted by clogged coolant conduits in the tools themselves, or influenced disadvantageously by the fact that the seal between the coolant tube and the coolant delivery system on the machine tool becomes leaky, so that coolant pressure declines and is no longer sufficient to push coolant into the small coolant conduits in the tools. A diminution in the coolant supply due to clogged coolant conduits or a leaking seal often leads, however, to overheating and thus to damage to the tool, so that frequent cleaning of the holder, the coolant tube, and the tools with which the holders are fitted, is necessary. In addition, the sealing ring on the machine tool must be replaced at relatively short intervals. If these time- and wage-intensive actions are omitted, the operational reliability of the machine tools equipped with the holders is reduced.

SUMMARY OF THE INVENTION

In view of the above, it is an object of the invention to improve the holder, and the coolant tube, mentioned at the outset in such a way that with a physically simple design, the operating reliability of a machine tool fitted with such a holder with coolant tube is improved.

According to the invention this object is achieved, in the case of the holder mentioned at the outset and the coolant tube mentioned at the outset, by the fact that a cover for the inlet opening is provided, which prevents chips from getting into the coolant tube.

The object underlying the invention is thereby completely achieved. Specifically, if the holder is used together with automatic tool changing mechanisms, the holders with the tools not currently being used are stored in a magazine position, where the tapered hollow shafts of the individual holders are covered in order to protect them from chips flying around in the working space of the machine tool. For tool changing, the holders are transferred out of the magazine position into the working position under the spindle, where the coupling and clamping operation described above then occurs.

The tapered hollow shaft is unprotected during transfer of the holder from the magazine position into the working position, so that during this time, chips can enter the interior of the tapered hollow shaft and the coolant tube, which is open at the top. These chips are then, after clamping of the holder, transported by the flowing coolant to the tool, where they can clog the narrow conduits through which coolant is intended to pass to the tool. The inventor of the present application has now recognized that it is not necessary also to cover or protect the entire tapered hollow shaft during the transfer between the magazine position and the working position, but rather that a cover only on the inlet opening of the coolant tube is sufficient to prevent contamination with chips. It is thus possible in this case to select an economical, simply designed cover solely for the coolant tube. In the magazine position, it is necessary to protect the entire tapered hollow shaft from flying chips and coolant/cutting fluid, so that chips adhering to the exterior surface of the tapered hollow shaft do not negatively affect clamping into the tool receptacle. Protection of this kind is not necessary during the brief transfer time from the magazine position into the working position, since no machining of workpieces takes place during this tool change, so that no chips are flying around in the working space. The inventor of the present application has recognized, however, the fact that chips frequently drop down from parts of the machine tool during the tool change; these chips would not remain suspended on the tapered hollow shaft, but would represent a hazard for cooling of the tool if they got into the interior of the coolant tube.

The covering provided according to the invention for the inlet opening of the coolant tube can consist, for example, in the fact that the upper opening of the tapered hollow shaft is closed off by a lid which opens inward. Said lid can, for example, automatically be pivoted when the jaw segments of the clamping system are introduced into the interior of the tapered hollow shaft.

The object underlying the invention is also achieved, in the case of the holder mentioned at the outset and the coolant tube, by the fact that a further tube section, the outside diameter of which is smaller than that of the upper tube section, adjoins the upper tube section at the bottom, such that upon coupling of the holder, the sealing ring is located in the region of the further tube section, and is not brought into sealing contact with the enveloping surface of the upper tube section until clamping occurs.

The object underlying the invention is again completely achieved in this manner. Specifically, the inventor of the present application has recognized that the sealing problems are attributable to wear on the sealing ring, in particular because of the radial and axial relative motion between the sealing ring and the enveloping surface of the coolant tube during the coupling and clamping operation. This is because the known coolant tubes have a continuously constant outside diameter in the longitudinal direction, i.e. have globally a cylindrical enveloping surface, so that the sealing ring rubs against this enveloping surf ace in both the radial and axial direction during the coupling and clamping operation, and thereby becomes prematurely worn.

Because the further tube section now has a reduced outside diameter, the sealing ring is no longer in contact with the enveloping surface of the coolant tube during the coupling operation, i.e. before the draw-in bar and the draw-in taper are pulled partly back out of the tapered hollow shaft in order to clamp the jaw segments, so that no wear occurs during the relative motion. When the tapered hollow shaft is inserted into the tool receptacle, the sealing ring is thus pushed downward over the upper tube section until, in the further tube section, it moves away from the enveloping surface. After coupling, the sealing ring is then pulled, during the clamping operation, back up onto the upper tube section where it provides the appropriate sealing.

This simple design change to the coolant tube thus makes it possible to eliminate sealing problems in the provision of coolant to the tools.

It is of course particularly advantageous if the two actions described above are combined, since both the sealing problems and the supply problems are thereby eliminated. A further advantage of these features is that design changes are required only to the coolant tube, so that existing machine tools and HSK tool holders can continue to be used or can be refitted.

In an embodiment, it is preferred if the cover comprises at least one sieve.

The advantage here is that a pivotable or otherwise movable cover is not necessary, but rather a simple sieve is used, which can remain permanently on the inlet opening. This feature is therefore advantageous in terms of design.

It is further preferred if the coolant tube has a centered coolant conduit, the inside diameter of which is enlarged in stepped fashion in the region of the inlet opening to form a shoulder, such that the sieve rests on the shoulder.

The advantage here is that a relatively minor design change to existing coolant tubes is necessary in order to provide for accommodation of the sieve. The coolant conduit must simply be slightly bored out from the inlet side before the sieve can then be set in place. The use of a sieve either inside, so to speak, or behind the inlet opening reliably prevents chips from getting into the coolant conduit, from whence they can then end up, because of the flow of coolant, in the branching coolant conduits of the tool. The mesh size of the sieve must be sufficiently small that even small chips are reliably retained. Although the mesh of the sieve and the chips which may be resting on the sieve do diminish the total throughput of coolant, this diminution is not so great that the slight reduction in coolant supply to the tool causes the tool to overheat. Such overheating occurs only if chips penetrate into the coolant conduits and completely block the supply of coolant.

It is preferred in this context if the sieve is retained in the enlarged diameter of the coolant conduit by a clamping element, preferably a toothed ring.

This feature is advantageous in terms of design because installation of the sieve is very easy to accomplish.

It is preferred in this context if the sieve rests on a further sieve with a larger mesh size.

The advantage here is that because of the larger mesh size, the further sieve is more stable, in other words stabilizes and supports the finer sieve, although because of the mutual coverage there is no reduction in effective mesh size, so that flow is ensured.

It is further preferred if the cover comprises an insert which sits in a stepped hole on the inlet opening and is braced against a shoulder, the insert carrying at least one sieve and being supported on its rim, the insert preferably having an outlet conduit whose diameter is smaller than the inside diameter of the coolant conduit.

The advantage here is that one or more sieves can be inserted into the insert; the mesh sizes of the sieves can be different from one another, thus providing for reliable retention of chips and good support of the outer, finest sieve. The total throughput of coolant is already diminished because of the outlet conduit, so that the sieve or sieves do not need to withstand excessive coolant pressure, so that they cannot be deformed so much as to be torn out of their anchoring by the coolant pressure. In this context, the insert itself ensures good support for the sieve or sieves, so that overall, the sieve or sieves are held securely in the region of the inlet opening, thus retaining chips and guaranteeing a reliable supply of coolant to the tool.

It is further preferred if a conical transition region is provided between the upper and the further tube section.

The advantage with this feature is that the sealing ring is protected during the clamping operation. This is because the sealing ring can slide up on the conical transition region, so that it comes to rest on the upper tube section without having to pass over sharp transitions.

It is preferred in this context if the outside diameter of the further tube section is less than 10% smaller than that of the upper tube section.

The advantage here is that existing coolant tubes can be easily redesigned or reworked, since the thickness of the tube wall is sufficient to allow the outside diameter to turned down by 10% in the region of the further tube section.

It is generally preferred if the coolant tube has at its lower end a flange by means of which it is screwed onto the holder by means of a coupling nut with external threads.

This feature is known per se; it has the advantage that the coolant tube can be replaced. This makes it possible, in the case of existing holders, to replace the old coolant tube with a coolant tube according to the invention.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Embodiments of the invention are shown in the drawings and will be explained in more detail in the description below. In the drawings.

DETAILED DESCRIPTION OF PREFERRED EMBODIMENTS

Figure 1:
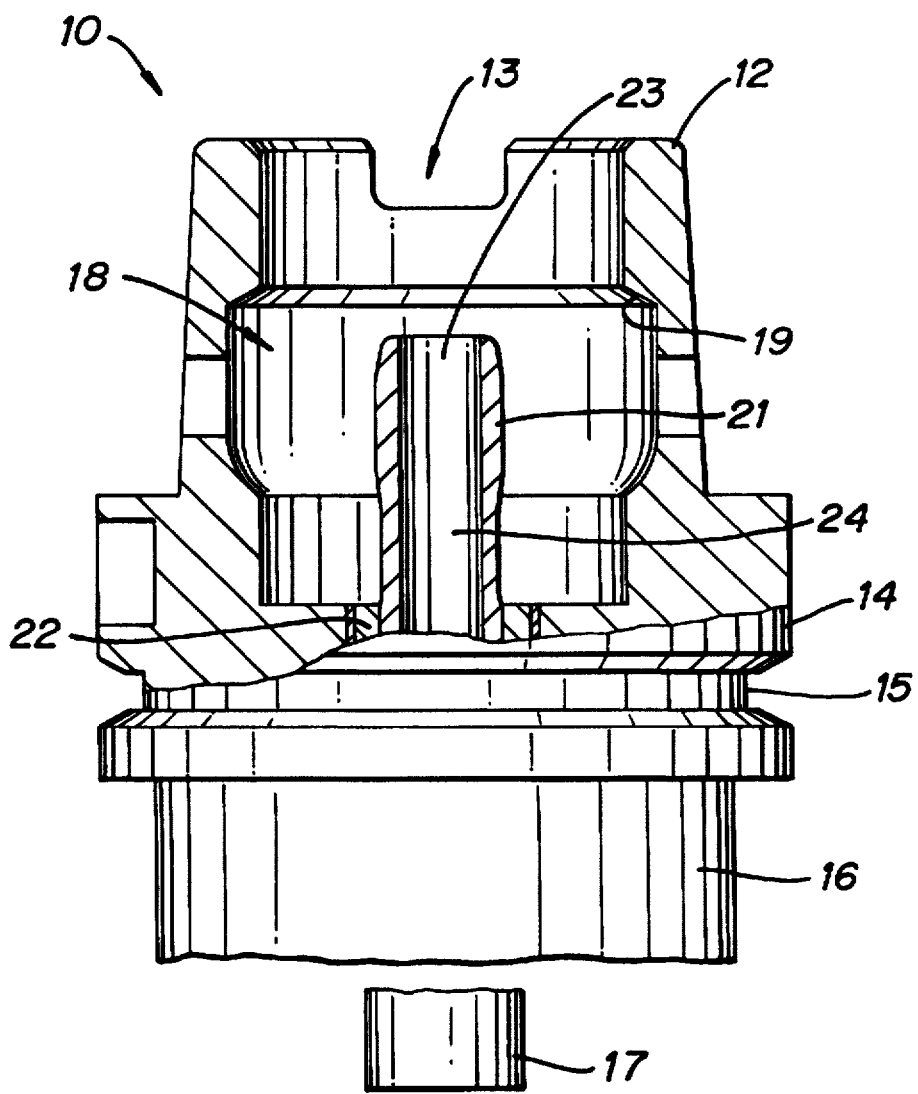
FIG. 1 shows the new holder with the new coolant tube, in a schematic and partly sectioned side view.

In FIG. 1, 10 designates a holder for a tool (not shown). The holder is shown in FIG. 1 in a schematic, partly sectioned side view.

Holder 10 has first of all a tapered hollow shaft 12, known per se, in which an upper opening 13 is provided. Adjoining tapered hollow shaft 12 at the bottom is a collar 14, on which an externally circumferential gripper groove 15 for automatic tool changing mechanisms is provided.

Indicated below collar 14 is a holding shift 16 to which tools 17 can be selectably attached.

Tapered hollow shaft 12 has in its interior 18 a circumferential shoulder 19 that coacts with jaw segments of a clamping system, by means of which holder 10, known to this extent, can be inserted into a tool receptacle in a spindle of a machine tool.

Arranged in interior 18 of tapered hollow shaft 12, in a manner known per se, is a coolant tube 21 that is attached detachably to holder 10 by means of a coupling nut 22.

Coolant tube 21 has a coolant conduit 24, opening into an inlet opening 23, through which the particular tool attached to holding shaft 16 is supplied with coolant, which is delivered from the machine tool in a manner yet to be described.

Figure 2:
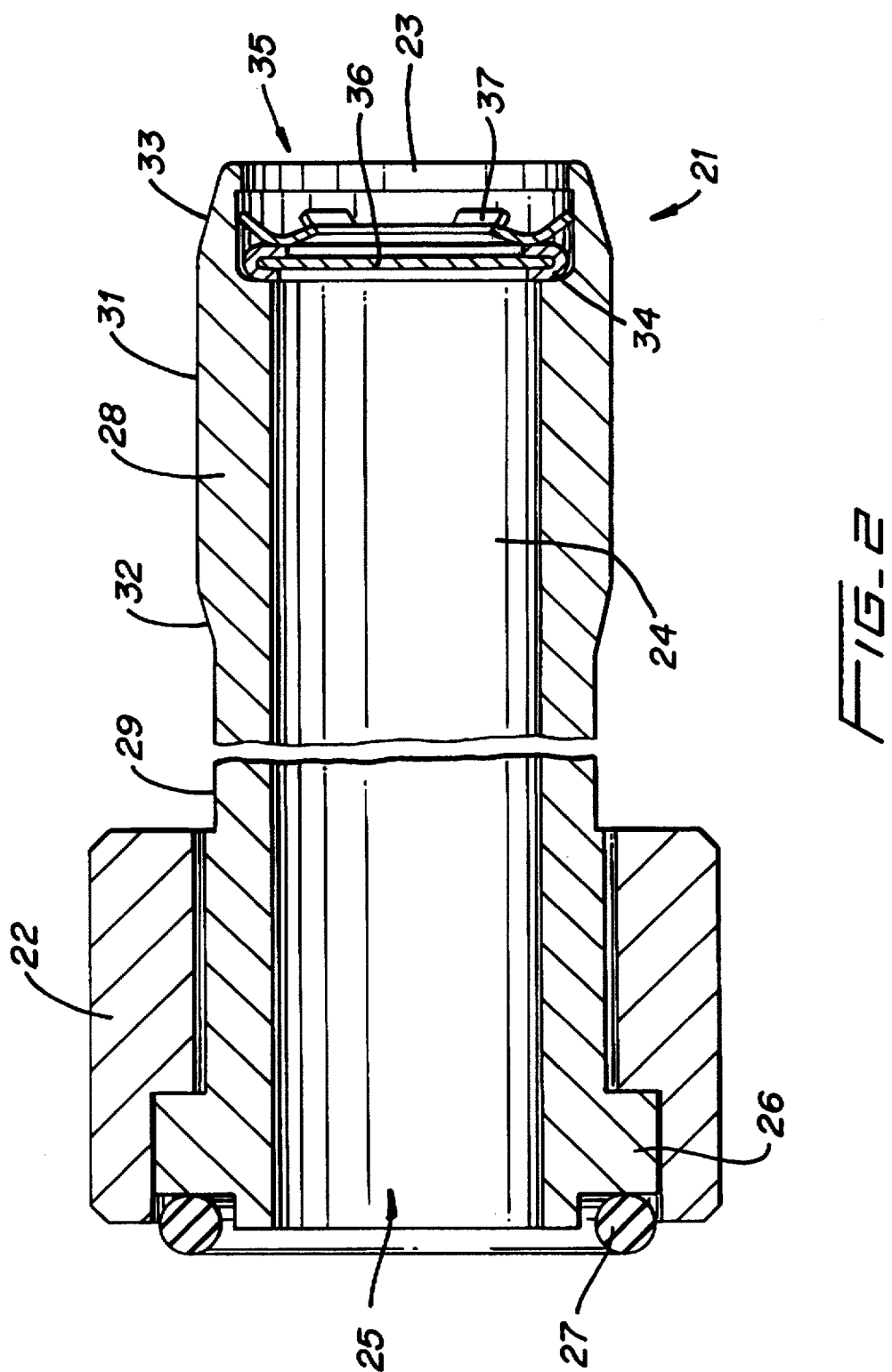
FIG. 2 shows a longitudinal section through a first embodiment of the new coolant tube of FIG. 1.

FIG. 2 shows coolant tube 21 of FIG. 1 in more detail, in a schematic longitudinal section. It is first of all evident that coolant tube 21 has at its lower end 25 a flange 26 with which coupling nut 22, which has external threads for screwing into holder 10, is in engagement. Also shown is a sealing ring 27 which ensures that coolant tube 21 fits sealingly in holder 10.

Coolant tube 21 has at its upper end an upper tube section 28 adjoining which, remote from inlet opening 23, is a further tube section 29 whose outside diameter is smaller than the outside diameter of upper tube section 28, the cylindrical enveloping surface 31 of which leads into further tube section 29, forming a conical transition region 32. The outside diameter at upper tube section 28 is, for example, 12 mm, while the outside diameter at further tube section 29 is 11 mm, i.e. is slightly less than 10% smaller than the outside diameter of upper tube section 28.

Remote from conical transition region 32, upper tube section 28 also has a conical tip 33 which tapers toward inlet opening 23.

Coolant conduit 24 is enlarged in stepped fashion in the region of conical tip 33, forming a shoulder 34 so that inlet opening 23 has a greater inside diameter than the remainder of coolant conduit 24.

In order to pre vent the penetration of chips into coolant conduit 24, a cover 35 is provided in the region of inlet opening 23. Cover 35 comprises a sieve 36 that rests on shoulder 34, as well as a toothed ring 37 which, as a clamping element, holds sieve 36 in the region of the enlarged inside diameter.

Returning to FIG. 1, it is evident that coolant tube 21 faces with its inlet opening 23 in the direction of upper opening 13 of tapered hollow shaft 12. Also noteworthy here is the fact that holder 10 is used in conjunction with automatic tool changing mechanisms which sequentially transfer holders 10 between a magazine position and a working position on the spindle of a machine tool. In the magazine position, the holders are located in sheath-like covers so that no chips can get onto tapered hollow shaft 12 or into interior 18 of tapered hollow shaft 12. During the transfer of holder 10 from the magazine position into the working position, however, upper opening 13 is unprotected, so that chips dropping down from parts of the machine tool can also get into inlet opening 23. Cover 35 now prevents such chips from getting into coolant conduit 24 and ultimately clogging the narrow coolant conduits in the tool (not shown) to such an extent that cooling of the tool no longer occurs.

For this purpose, sieve 36 must have a correspondingly small mesh size, so that even small chips cannot get into coolant conduit 24. Said chips thus remain behind in the region of inlet opening 23 on toothed ring 37 or sieve 36, where they may lead to a diminution in coolant flow. This diminution in the coolant flow is, however, in the experience of the inventor of the present application, so minor that cooling of the tool is not negatively influenced.

Figure 3:
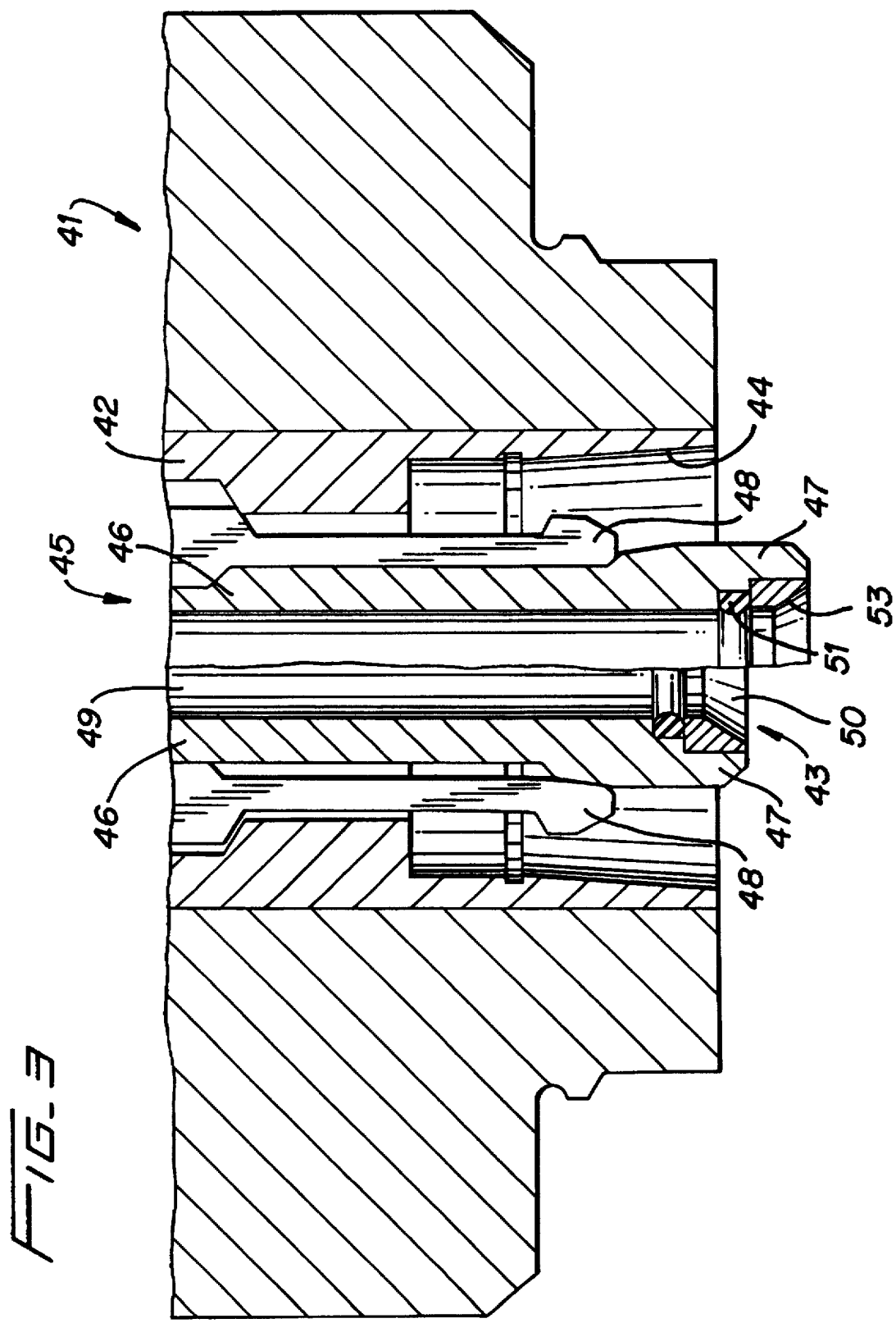
FIG. 3 shows, in a schematic representation, a partial longitudinal section through the region of the tool receptacle of a spindle of a machine tool.

FIG. 3 now shows, in partial and very schematic fashion, a portion of a machine tool 41 in the region of its spindle 42. Spindle 42 has a tool receptacle 43 which comprises a conical opening 44, the shape of which is complementary in configuration to that of tapered hollow shaft 12. Depiction of the tapered hollow shaft has been omitted in FIG. 3 for reasons of clarity.

7

Arranged in spindle 42 is a clamping system 45 that comprises, in a manner known per se, a draw-in bar 46 with conical draw-in taper 47, as well as jaw segments 48. Clamping system 45 is shown in the right half of FIG. 3 in the released state, and in the left half in the clamped state, in which draw-in bar 46 and draw-in taper 47 are drawn in, so that jaw segment 48 is pressed outward, where it comes into contact with shoulder 19 in interior 18 of tapered hollow shaft 12 (see FIG. 1).

A centered bore 49, through which coolant is delivered to coolant tube 21 in holder 10, is provided in draw-in bar 46 and in draw-in taper 47. Centered bore 49 is enlarged in stepped fashion at its lower end 50, and carries there a sealing ring 51 which is screwed in by way of a brass insert 53.

When tapered hollow shaft 12 is introduced into tool receptacle 43, sealing ring 51, which is preferably an O-ring, first slides over conical tip 33 onto enveloping surface 31 of upper tube section 28. Upon further insertion of tapered hollow shaft 12 into tool receptacle 43, sealing ring 51 is pushed down again away from upper tube section 28, and is then initially located in the region of further tube section 29, where it is not in contact with enveloping surface 31.

At this point in the coupling/clamping of holder 10 into tool receptacle 43, clamping system 45 is in the position shown in the right half of FIG. 3.

Spindle 42 now performs a relative movement with respect to holder 10, which is held rotatably by the tool changing mechanism. Provided between spindle 42 and holder 10 are slide blocks and depressions—known per se, and not depicted in the drawings for reasons of clarity—which interlock with one another only in a specific radial alignment between spindle 42 and holder 10. As soon as this interlocking has taken place—i.e. holder 10 has been coupled into spindle 42—clamping system 45 is actuated. To this end, draw-in bar 46 is pulled back so that draw-in taper 47 presses jaw elements 48 outward, causing tapered hollow shaft 12 to be pulled slightly farther into conical opening 44 and finally clamped nonrotatably.

During this clamping operation, draw-in bar 46 executes a larger stroke which causes sealing ring 51 to be pulled back up over conical transition region 32 onto enveloping surface 31, where it provides tight sealing so that coolant delivered through centered bore 49 cannot run along on the outside of coolant tube 21.

Sealing ring 51 thus slides substantially in the axial direction on enveloping surface 31; conical tip 33 and conical transition region 32 make it easier for sealing ring 51 to slide on. Sealing ring 51 is not resting against enveloping surface 31 during the coupling operation, i.e. during the radial relative motion between holder 10 and spindle 42, so that no wear can take place there. A frictional process in the axial direction takes place only during the clamping operation, but the wear which occurs in this context is relatively minor, so that the service life of sealing ring 51 and thus of the entire seal for the coolant supply system is much longer than in the case of the related art, in which further tube section 29 has the same diameter as upper tube section 28.

Figure 4:
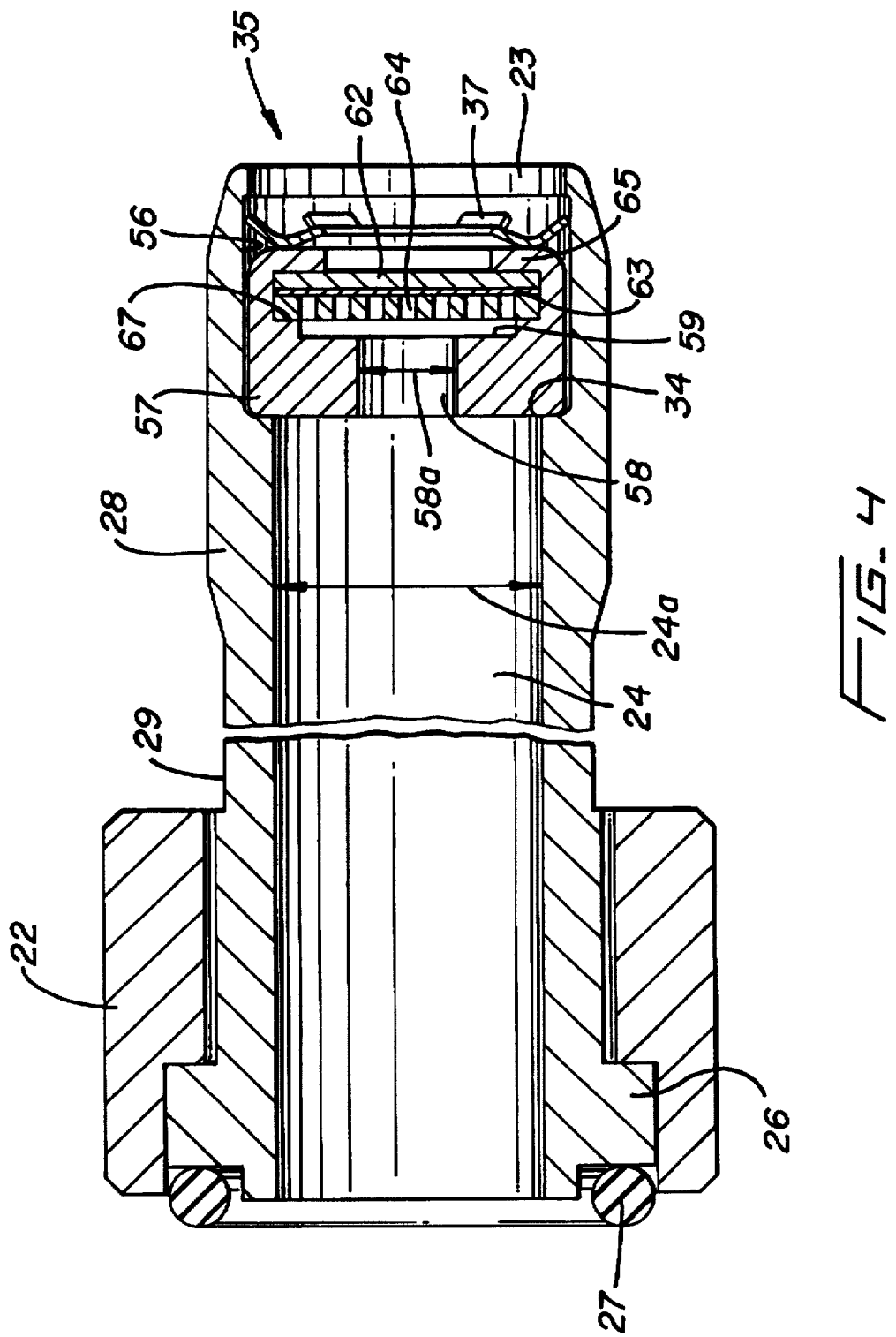
FIG. 4 shows, in a representation like that of FIG. 2, a second embodiment of the new coolant tube.

FIG. 4 shows, in a depiction like that of FIG. 2, a further embodiment of the new coolant tube 21. Coolant tube 21 now has, in the region of inlet opening 23, a deeper stepped hole 56 occupied by a cylindrical insert 57, which is held by toothed ring 37 already known from FIG. 2.

Insert 57 has an outlet conduit 58 whose inside diameter 58a is considerably smaller than the inside diameter, indicated at 24a, of coolant conduit 24. Adjoining outlet conduit 58 and forming two shoulders 59, 61 is a further stepped hole; a plurality of sieves 62, 63, 64, which are pressed by a crimped-over rim 65 of insert 57 onto shoulder 61, rest on second shoulder 51.

The mesh sizes of sieves 62, 63, and 64 are different, outermost sieve 62 having the smallest mesh size, and inner sieve 64 the largest mesh size. The coarser sieves 63, 64 constitute, so to speak, a support for fine sieve 62, the effective mesh size corresponding approximately to that of sieve 62, since sieves 63, 64 have considerably larger meshes.

Because of the support against shoulder 61, and the reduction in coolant pressure by outlet conduit 58, the total of three sieves 62, 63, 64 must withstand less pressure than sieve 36 in FIG. 2. Moreover, deflection of sieves 62, 63, 64 is prevented because multiple sieves are arranged one below another in this case; this is the result in particular of the very rigid sieve 64. If sieves 62, 63, 64 should nevertheless deflect to the left in FIG. 4, they then come into contact with shoulder 59, which prevents them from deflecting further or sliding off shoulder 61. Thus in the case of the embodiment according to FIG. 4 it is not possible for sieves 62, 63, or 64 to end up in coolant conduit 24 as a result of excessive coolant pressure, which is entirely possible if sieve 36 as shown in FIG. 2 becomes severely clogged.

Particular reference should once again be made to the fact that wear on sealing ring 51 is considerably reduced because of the diminished outside diameter of coolant tube 21 in the region of further tube section 29, so that because of the improved sealing of the coolant system, the operating reliability of machine tools fitted with the new holder 10 having the new coolant tube 21 is increased.

A further increase in operating reliability is achieved by means of cover 35, which prevents the machine tool's coolant supply from being interrupted, as already described in detail earlier.

What I claim is:

1. Coolant tube for a holder for a tool, said holder comprising a tapered hollow shaft, having an upper opening, for clamping into a tool receptacle, and the coolant tube being arranged in the interior of the tapered hollow shaft for delivery of coolant to the tool, whereby the coolant tube has an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact, wherein a cover for the inlet opening is provided, which prevents chips from getting into the coolant tube.

2. Coolant tube according to claim 1, wherein a further tube section, the outside diameter of which is smaller than that of the upper tube section, adjoins the upper tube section at the bottom remote from the inlet opening, such that upon coupling of the holder, the sealing ring is located in the region of the further tube section, and is not brought into sealing contact with the enveloping surface of the upper tube section until clamping occurs.

3. Coolant tube according to claim 1, wherein the cover comprises at least one sieve.

4. Coolant tube according to claim 3, wherein the coolant tube has a centered coolant conduit, the inside diameter of which is enlarged in stepped fashion in the region of the inlet opening to form a shoulder, such that the sieve rests on the shoulder.

5. Coolant tube according to claim 4, wherein the sieve is retained in the enlarged diameter of the coolant conduit by a clamping element, preferably a toothed ring.

6. Coolant tube according to claim 3, wherein the sieve rests on a further, coarser sieve.

7. Coolant tube according to claim 3, wherein the cover comprises an insert which sits in a stepped hole on the inlet opening and is braced against a shoulder, the insert carrying at least one sieve and being supported on its rim.

8. Coolant tube according to claim 4, wherein the cover comprises an insert which sits in a stepped hole on the inlet opening and is braced against a shoulder, the insert carrying at least one sieve and being supported on its rim.

9. Coolant tube according to claim 7, wherein the insert has an outlet conduit whose inside diameter is smaller than the inside diameter of the coolant conduit.

10. Coolant tube for a holder for a tool, said holder comprising a tapered hollow shaft, having an upper opening, for clamping into a tool receptacle, and the coolant tube being arranged in the interior of the tapered hollow shaft for delivery of coolant to the tool, whereby the coolant tube has an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact, wherein a further tube section, the outside diameter of which is smaller than that of the upper tube section, adjoins the upper tube section at the bottom remote from the inlet opening, such that upon coupling of the holder, the sealing ring is located in the region of the further tube section, and is not brought into sealing contact with the enveloping surface of the upper tube section until clamping occurs.

11. Coolant tube according to claim 10, wherein a cover for the inlet opening is provided, which prevents chips from getting into the coolant tube.

12. Coolant tube according to claim 10, wherein a conical transition region is provided between the upper and the further tube section.

13. Coolant tube according to claim 12, wherein the outside diameter of the further tube section is less than 10% smaller than that of the upper tube section.

14. Coolant tube according to claim 10, wherein the coolant tube has at its lower end a flange by means of which it is screwed onto the holder by means of a coupling nut with external threads.

15. Holder for a tool, having a tapered hollow shaft, which has an upper opening, for clamping into a tool receptacle, and having a coolant tube arranged in the interior of the tapered hollow shaft for delivery of coolant to the tool, whereby the coolant tube has an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact, wherein a cover for the inlet opening is provided, which prevents chips from getting into the coolant tube.

16. Holder according to claim 15, wherein a further tube section, the outside diameter of which is smaller than that of the upper tube section, adjoins the upper tube section at the bottom remote from the inlet opening, such that upon coupling of the holder, the sealing ring is located in the region of the further tube section, and is not brought into sealing contact with the enveloping surface of the upper tube section until clamping occurs.

17. Holder according to claim 15, wherein the cover comprises at least one sieve.

18. Holder according to claim 17, wherein the coolant tube has a centered coolant conduit, the inside diameter of which is enlarged in stepped fashion in the region of the inlet opening to form a shoulder, such that the sieve rests on the shoulder.

19. Holder according to claim 18, wherein the sieve is retained in the enlarged diameter of the coolant conduit by a clamping element, preferably a toothed ring.

20. Holder according to claim 17, wherein a conical transition region is provided between the upper and the further tube section.

21. Holder according to claim 20, wherein the outside diameter of the further tube section is less than 10% smaller than that of the upper tube section.

22. Holder for a tool, having a tapered hollow shaft, which has an upper opening, for clamping into a tool receptacle, and having a coolant tube arranged in the interior of the tapered hollow shaft for delivery of coolant to the tool, whereby the coolant tube has an inlet opening for coolant, facing the upper opening, as well as an upper tube section having a cylindrical outer enveloping surface with which, when the holder is clamped into the tool receptacle, a sealing ring, which is arranged in a delivery tube for coolant which then at least partly overlaps the coolant tube, is in contact, wherein a further tube section, the outside diameter of which is smaller than that of the upper tube section, adjoins the upper tube section at the bottom remote from the inlet opening, such that upon coupling of the holder, the sealing ring is located in the region of the further tube section, and is not brought into sealing contact with the enveloping surface of the upper tube section until clamping occurs.

23. Holder according to claim 22, wherein a cover for the inlet opening is provided, which prevents chips from getting into the coolant tube.

24. Holder according to claim 23, wherein the cover comprises at least one sieve.

* * * * *